US009863526B2

(12) United States Patent
Hoskins et al.

(10) Patent No.: US 9,863,526 B2
(45) Date of Patent: Jan. 9, 2018

(54) ROTARY SWITCH WITH PROGRAMMABLE END-STOPS AND VARIABLE TACTILE FEEDBACK

(71) Applicant: Kostal of America, Troy, MI (US)

(72) Inventors: Steven R. Hoskins, Walled Lake, MI (US); Michael F. Tefend, Lake Orion, MI (US); Josef Kortan, Madison Heights, MI (US)

(73) Assignee: Kostal of America, Troy, MI (US)

( * ) Notice: Subject to any disclaimer, the term of this patent is extended or adjusted under 35 U.S.C. 154(b) by 366 days.

(21) Appl. No.: 14/564,638

(22) Filed: Dec. 9, 2014

(65) Prior Publication Data

US 2015/0159747 A1 Jun. 11, 2015

Related U.S. Application Data

(60) Provisional application No. 61/913,680, filed on Dec. 9, 2013.

(51) Int. Cl.
*F16H 59/08* (2006.01)
*F16H 59/02* (2006.01)
*F16H 61/24* (2006.01)

(52) U.S. Cl.
CPC ......... *F16H 59/0217* (2013.01); *F16H 59/08* (2013.01); *F16H 61/24* (2013.01); *F16H 2059/081* (2013.01); *F16H 2059/082* (2013.01); *F16H 2061/241* (2013.01); *Y10T 74/20098* (2015.01); *Y10T 307/786* (2015.04)

(58) Field of Classification Search
CPC ...... F16H 59/0217; F16H 59/08; F16H 61/24; F16H 2059/081; F16H 2059/082; F16H 2061/241
See application file for complete search history.

(56) References Cited

U.S. PATENT DOCUMENTS

| 5,161,422 | A | * | 11/1992 | Suman | B60K 20/04 180/315 |
|---|---|---|---|---|---|
| 7,971,498 | B2 | | 7/2011 | Meyer et al. | |
| 8,164,372 | B2 | | 4/2012 | Mitsubori et al. | |
| 2009/0038426 | A1 | * | 2/2009 | Buttolo | F16H 61/24 74/473.3 |
| 2009/0107287 | A1 | * | 4/2009 | Seki | B60K 37/06 74/504 |
| 2010/0152980 | A1 | * | 6/2010 | Jones | B62D 33/0608 701/49 |
| 2012/0249315 | A1 | * | 10/2012 | Vanhelle | B60K 37/06 340/425.5 |
| 2015/0159747 | A1 | * | 6/2015 | Hoskins | F16H 59/0217 74/473.23 |

* cited by examiner

*Primary Examiner* — David M Fenstermacher
(74) *Attorney, Agent, or Firm* — Butzel Long; Gunther J. Evanina

(57) ABSTRACT

Improved rotary switch systems and methods are disclosed. Such systems and methods may be used in vehicles that implement shift-by-wire transmission systems. The switch systems and methods may include programmable end-stops and/or variable tactile feedback.

7 Claims, 4 Drawing Sheets

ROTARY SWITCH WITH PROGRAMMABLE END-STOPS AND VARIABLE TACTILE FEEDBACK

RELATED APPLICATIONS

The present application claims the benefit of and priority to U.S. Provisional Application No. 61/913,680, filed Dec. 9, 2013, which is hereby incorporated by reference in its entirety.

BACKGROUND

The present disclosure relates generally to rotary switches. The rotary switches can be used, for example, in connection with shift by wire transmissions affiliated with vehicles including but not limited to automotive vehicles.

Increasingly, a need for more sophisticated human machine interface (HMI) is becoming apparent. For example, drivers may expect or desire a range of rotational travel and the force of a detent that bears a relationship to particular function. That is, the driver may prefer feedback suggesting that there are no further gears to switch into or feedback making it difficult to switch from, for example, DRIVE to REVERSE. Current approaches for achieving such sophistication often involve the use of solenoids and motors.

However, solenoids and motors present certain challenges. Among others, solenoids and motors can create undesirable noises. Additionally, solenoids and motors can take an undesirable amount of time to adjust from an undesired position to a desired position.

SUMMARY

Systems, devices and methods are provided herein that may address at least one of issues remaining with rotary switches, including those used in shift by wire applications. The disclosure may present advantages over prior solutions which include use of split gear technology to provide accurate measurement of input knob rotation. Another advantage may be that, by eliminating motors and solenoids, the systems and devices described in the present disclosure may be quieter and faster (response time) than conventional systems that use motors and solenoids.

DESCRIPTION

Various embodiments of the present disclosure will be described with reference to the accompanying figures. Such references are intended to be exemplary and not limiting to the appended claims. In the following description, specific details are set forth, such as specific materials, process and equipment, to provide an exemplary understanding. It will be apparent, however, to one skilled in the art that the present invention may be practiced without these specific details.

Figure 1:
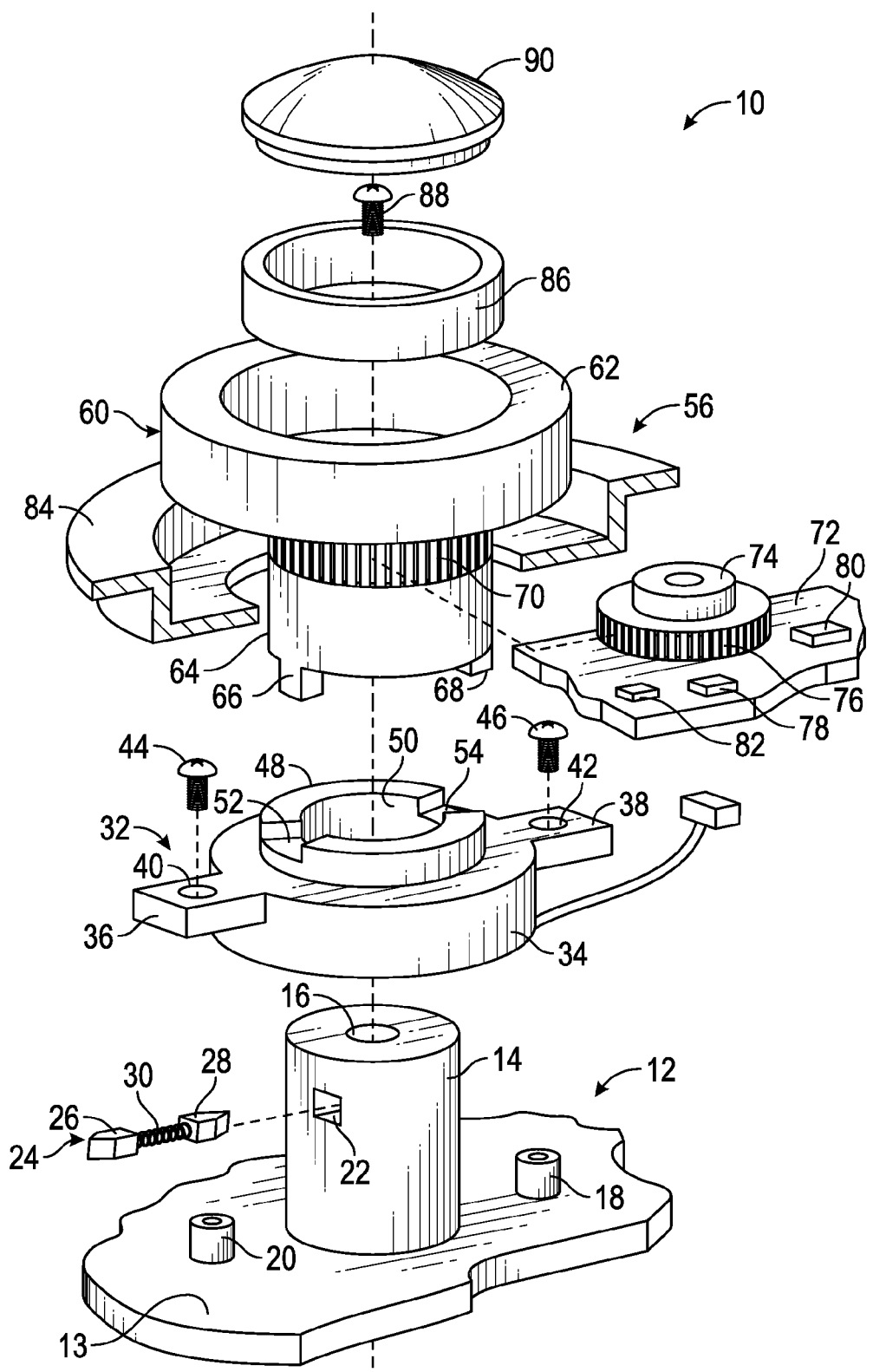
FIG. 1 is an exploded view of an exemplary assembly.

Turning now to the Figures, wherein like numbers refer to like structures, and particularly to FIG. 1, there is depicted there in a schematic representation and a rotary switch assembly 10 accordingly to at least one aspect of the present disclosure. While the construction of one such rotary switch is described, no limitation is intended by the description as follows.

Rotary switch assembly 10 includes a base assembly 12, with a column 14 mounted to or integral with a surface 13. The column is of sufficient dimension, axially and radially, to coaxially carry the brake device 32 and detent knob assembly 56 in a manner to be hereafter described. The column is equipped with an aperture 16, located coaxial with the column, to accept a fastener, to be hereinafter described. The surface is also equipped with fastener apertures, to accept attachments, to permit assembly and disassembly of the rotary knob switch assembly 10 in a manner to be hereinafter described. The column is provided with a transverse passage 22, configured to accept detent assembly 24 therein. The detent assembly is shown being comprised of opposed detents 26 and 28, separated by a biaser 30, shown as a coil spring, but may be an elastic material, or any other suitable biaser to sufficiently urge the detents away from each other into engagement with the inner walls of the knob assembly in a manner to be hereafter described.

Electronically controlled brake device 32 includes a body 34 with opposed flanges 36 and 38, respectively, equipped with apertures 40 and 42, through which attachment devices 44 and 46 extend. While depicted as screws, the attachment devices could be detachable clips or snap fits or any other suitable attachment. In addition, while aperture to accept the attachment devices are shown, it is also contemplated that the flanges would include integral attachment devices, thereby obviating the need for apertures through which attachment devices are to be inserted. The body has a brake assembly collar 48, surrounding a central aperture 50 extending through the body of the brake assembly. The central aperture is dimensions to permit the insertion over the column 14 of the base. In the case of a vehicular application of the present disclosure, the brake device is electronically connected at 49, such as, for example the vehicle common area network (CAN) to a transmission controller 51 having a memory and tables or maps indicative of the operational status of the transmission, such that the status of the transmission can be communicated to the micro controller 80 to permit operation of the knob assembly in a manner to be hereinafter described. The collar further includes detent engagement surfaces 52 and 54, to act as end stops to the rotary movement of the knob assembly, in a manner to be hereinafter described.

The detent knob assembly 56, which may be rotatable over a 360 degree range, is equipped with a body portion 58 dividable into a knob collar portion 62 and a column body portion 64. The column body portion is equipped at its distal end 63 with opposed detents 66 and 68. The detents are configured such that they may matingly engage detent engagement surfaces 52 and 54, respectively, in the brake assembly. The detent knob assembly is further equipped with a central aperture 67 that extends the length "L" of the knob assembly, and is of sufficient dimensions to permit column 14 to coaxially carry the knob assembly. The column body 64 is further circumferentially equipped with gear engagement 70 adapted to engage the magnetic measurement gear 74 on the printed circuit board (PCB) in a manner to be hereinafter described.

The PCB assembly 72 is, in this embodiment, located in close proximity to the rotary knob assembly. The PCB assembly may include a magnetic measurement gear 74, having a body portion 71 and a gear teeth portion 73. A central aperture 69 is provided to permit the gear to rotate about an axis upon which it is carried when the gear teeth 76 engage the gear teeth engagement 70 of the knob assembly, such that rotation of the knob causes the rotation of the magnetic gear that generates a magnetic signal over the magnetic sensor 78 carried on the PCB. The sensor creates a data signal indicative of the rotary position of the knob and transmits it to the microcontroller 80. Microcontroller 80 has memory and operating instruction resident therein and compares the rotary position of the magnetic gear, and by extension, the position of the rotary knob, with the operation status of the vehicle. The vehicle status includes transmission status, vehicle door positions or any other operating condition that is useful in the operation of a vehicle. If the comparison indicates the knob position is out of synch with vehicle operating status, the braking device is modified to adjust the knob position with the actual vehicle status, in a manner to be hereinafter described.

A microcontroller 80 may be equipped with electronics (hardware and software) to be in communication with a vehicle bus. Microcontroller 80 may optionally include computer readable storage media for storing data representing instructions executable by a computer or microprocessor. Computer readable storage media may include one or more of random access memory as well as various non-volatile memory such as read-only memory or keep-alive memory. Computer readable storage media may communicate with a microprocessor and input/output circuitry via a standard control/address bus. As would be appreciated by one of ordinary skill in the art, computer readable storage media may include various types of physical devices for temporary and/or persistent storage of data. Exemplary physical devices include but are not limited to DRAM, PROMS, EPROMS, EEPROMS, and flash memory.

Figure 2:
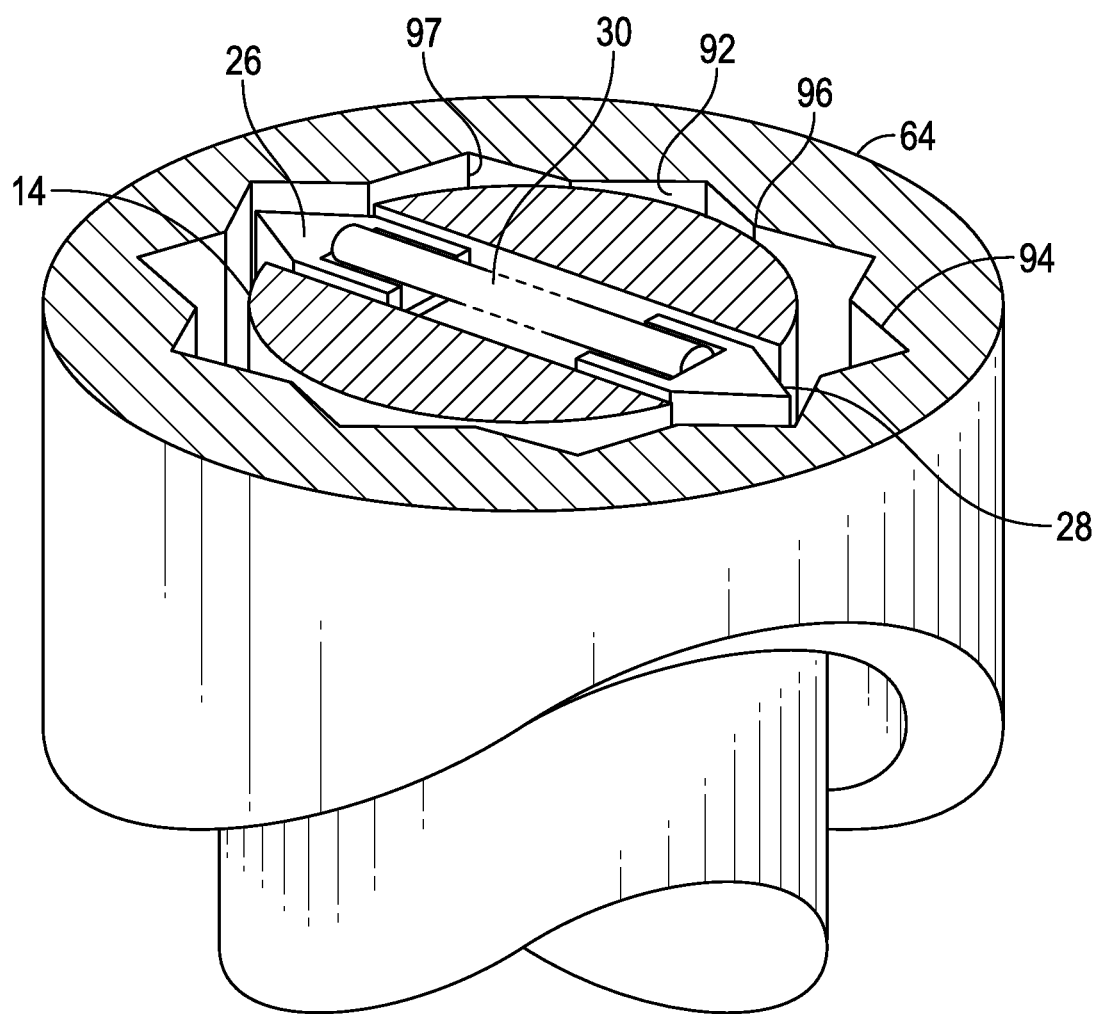
FIG. 2 is a detailed cut a way view of one part of the exemplary assembly.

Turning now to FIG. 2, there is depicted a schematic cutaway view of the knob assembly on the column, showing the inner surface 92 of the rotary knob central aperture. Specifically, the inner surface is equipped with a plurality of detent profile surfaces 94, circumferentially spaced about the inner surface of the central aperture. The each detent profile surface has a lobe 96 and a valley 97 in a sine like wave form. The valleys are configured to provide a complementary engagement surface to the detents. The detents carried in the column 14 engage these detent profile surfaces and interact with the valley portions to stop rotation of the knob and provide travel end stops to the rotary motion of the rotary knob. The brake device may further provide increasing rotational torque when it is desired to enhance detent feel during operation of the knob. This may be accomplished by applying current in a progressive manner to, thereby increasing resistance to the rotation the knob assembly as desired in order to impart resistive torsional force in a manner to be hereinafter described.

Figure 3:
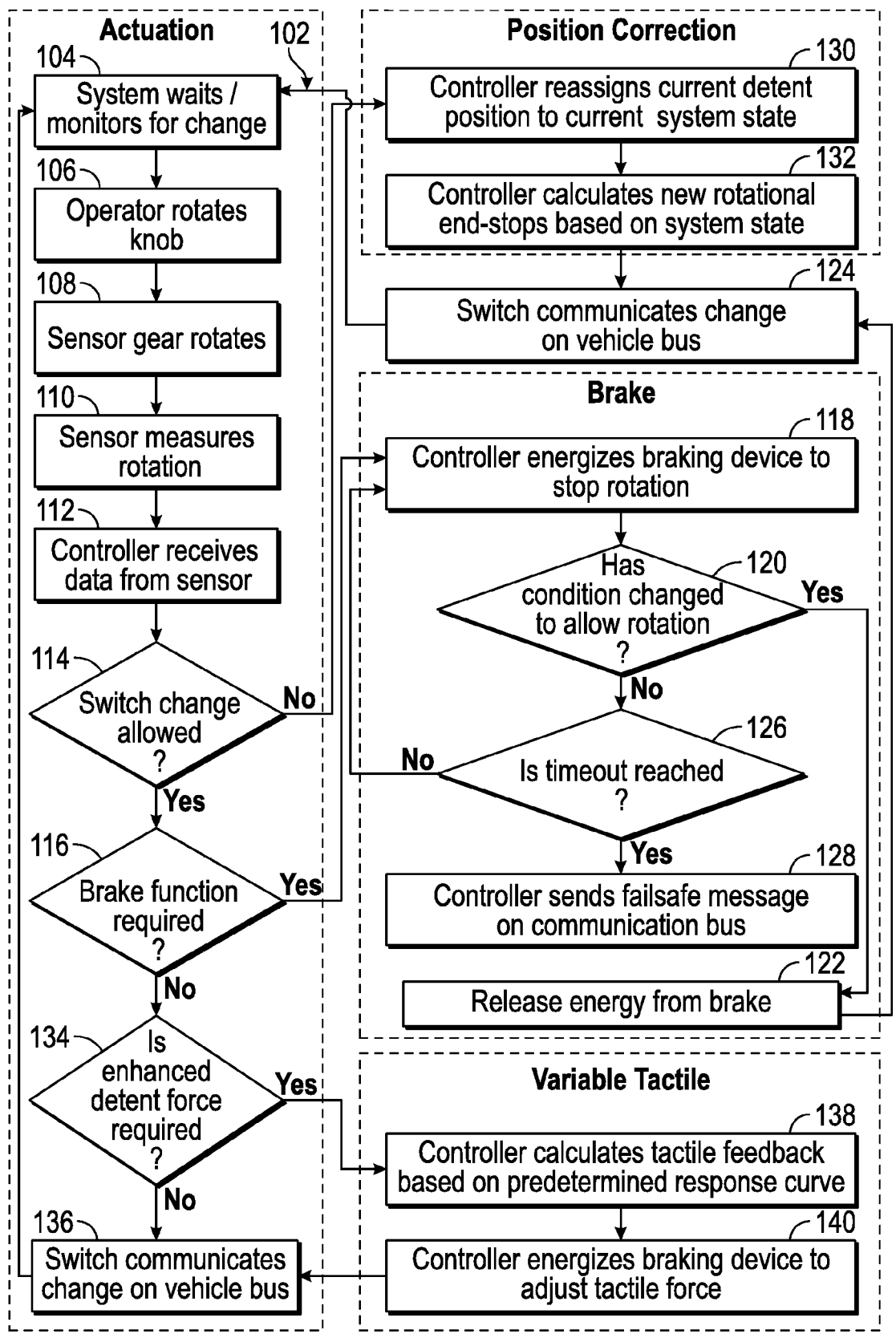
FIG. 3 is a graph mapping degrees of rotation against torque.

Turning now to FIG. 3, there is depicted a schematic representation of the method 102 of operation of one embodiment of the present disclosure. Specifically, at step 104, the method monitors the vehicle for change through the data feedback from, for example, the CAN. The method monitors the transmission, vehicle status, speed or other aspects useful in determining whether the knob assembly is in proper position. At step 106 an operator turns the knob assembly. The rotation of the knob causes the magnetic gear assembly to rotate at step 108, and step 110 the sensor create data signal s indicative of the position of the magnetic gear, and step 112, the controller receives that data from the sensor. Step 114 is determining whether the knob is allowed to rotate using data from the magnetic sensor and microcontroller indicative of transmission state and vehicle status. If the determination at step 114 is "no", the method enters a position correction mode. Specifically, at step 130, the microcontroller reassigns the current detent position to the current system state. The method then proceeds to step 132 where the microcontroller determines new rotational end stops based upon current system state and then proceeds to step 124, where the switch communicates the change to the vehicle controller bus and then loops back to step 104.

If the determination in step 114 is "yes", the method proceeds to step 116 which is determining whether a brake function is required. If the determination in step 116 is "yes", step 118 is energizing the braking device to halt rotation of the knob. Step 120 is determining whether the transmission or other vehicle status changed to permit rotation of the knob. If the determination in step 120 is "yes", step 122 is releasing energy form the brake device, step 124 is the switch communicates the change on the vehicle bus in the microcontroller, and the system loops back to step 104.

If the determination in step 120 is "no", step 126 is determining whether timeout has been reached by comparing time elapsed to time in memory. If the determination in step 126 is "no", the system loops back to step 114. If the determination in step 126 is "yes" the microcontroller transmits a "failsafe" message on the vehicle communication bus, as at step 128.

If the determination at step 116 is "no", the method proceeds to step 134, which is determining whether an enhanced detent force is required. If the determination in step 134 is "no", the method proceeds to step 136 where the switch communicates the change on the microcontroller bus and the method loops back to step 104.

If the determination in step 134 is "yes", the method enters a variable tactile mode. Step 138 is determining tactile feedback based upon predetermined response curve in memory. Step 140 is energizing the braking device (and thereby the magnetic resistive fluid) to adjust the tactile force in keeping with the determination in step 138. After step 140, the system loops back to step 104.

Figure 4:
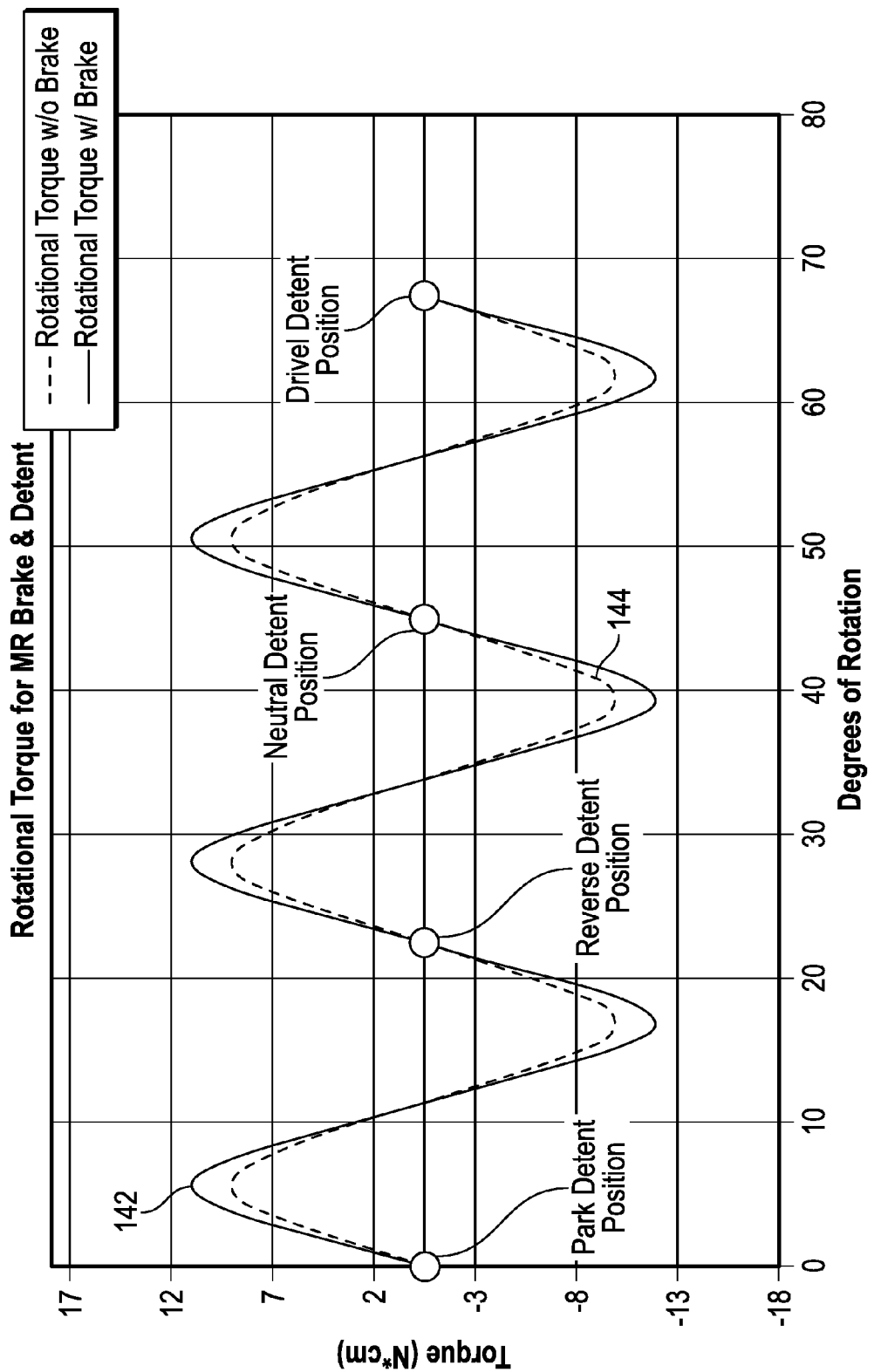
FIG. 4 is a flow chart showing knob rotational torque measurement curve with and without activation of the brake device.

FIG. 4 is a graphical representation of one example of a predetermined tactile force required to rotate the knob based upon a predetermined response curve. There is depicted therein an X axis representing degrees of rotation from 'PARK' to 'DRIVE' and Y axis represents the amount of torque required to rotate the input knob in N*cm at a given displacement of the input knob. Curve 142 is the rotation torque required when the brake device is activated and curve 144 is the rotation force required when the brake device is not activated. In this example the brake increases the amount of torque required to rotate the input knob between detent positions. If required, the brake can be energized to individual detent transitions (i.e. the transition from REVERSE to DRIVE) to communicate to the operator a change in vehicle direction has occurred.

In one embodiment of the disclosure as described, if the shifter detects a change in system state (i.e., transmission shifts to neutral due to engine stall) where the current gear indicated on the shifter does not match the current transmission gear, the microcontroller located on the PCB electronically reassigns the current detent input knob position to match the current transmission state. Furthermore, the microcontroller determines new rotational end stops based on current transmission state and stores this information in the on board memory located on the PCB board.

If the current gear indicated on the shifter matches the current transmission state, and the operator actuates the knob, the gear teeth in the knob drive the measurement gear and magnetic assembly to rotate above a magnetic sensor located on the PCB. The sensor measures the angular rotation of the knob and communicates the value to the microcontroller on the PCB and compares the angular value of the measurement gear and the magnetic assembly to the current vehicle transmission state.

If the knob is not allowed to rotate based on vehicle transmission state (i.e., vehicle brake is not pressed when shifting from PARK), the microcontroller on the PCB energizes the braking device that is in communication with the PCB, perhaps through a wiring harness electrical connection or in any other connection so that a signal is transmitted from the microcontroller to the braking device. The braking device uses a magnetic resistive (MR) fluid to act as a brake to resist rotation. The brake device interfaces with the knob through a slip fit feature that allows a small amount of knob rotation that is measured by the measurement gear and magnetic assembly. This slip fit feature and ability of the MR fluid to react rapidly allows the brake device to act as a one sided travel end stop. Furthermore, the controller starts a time out counter to prevent the brake device from remaining energized indefinitely.

If a condition is met (i.e., vehicle brake pedal depressed to allow rotation from PARK) the microcontroller releases energy from the brake device and allows the knob to rotate. If conditions for allowing the knob to rotate are not met, and the "time out" condition is met, the microcontroller sends a failsafe message on the vehicle communication bus allowing other vehicle systems to intervene.

If the knob is allowed to rotate and no enhanced detent effort (increased rotational effort to communicate to the operator that a significant event is occurring i.e., the operator is rotating from NEUTRAL to DRIVE) is required. Then each of the detent plungers interface with a detent profile formed in the inner walls of the knob central aperture. A spring or other biaser provides force to the detent plungers. If enhanced detent effort is required, the microcontroller on the PCB determines the required tactile force based on a predetermined response curve, as seen in FIG. 4, to carry the appropriate level to increase torque needed to rotate the knob.

Many modifications and variations of the present invention are possible in light of the above teachings. Therefore, within the scope of the appended claims, the present invention may be practiced other than as specifically described.

We claim:

1. A method of operation of an electronically controlled rotary switch, comprising:
   determining whether a rotary knob assembly without a solenoid or a motor is permitted to rotate based on data available to a controller in electrical communication with the knob assembly, the controller being adapted to receive sensed information about whether an attempt to rotate the switch occurred;
   sensing an attempted rotation of the rotary switch; and
   after sensed attempted rotation, if the rotary not permitted to rotate, energizing a braking device through the controller in electrical communication with the braking device to slow or stop rotation of the rotary knob.

2. The method of claim 1, further comprising:
   releasing the braking device if a predetermined amount of time has passed following energizing of the brake.

3. The method of claim 1, further comprising:
   releasing the braking device if a predetermined condition for release has been satisfied after energizing of the brake.

4. The method of claim 1 wherein the rotary switch is in electrical communication with a transmission of a vehicle.

5. The method of claim 4, wherein the data available to the controller is that the vehicle is in drive and an attempted rotation is a rotation that would cause the transmission to place the vehicle in reverse.

6. The method of claim 4, wherein the braking device stops rotation of the rotary switch.

7. The method of claim 4, wherein the braking device provides tactile feedback by making rotation of the rotary switch require an increasing magnitude of torque to turn using magneto rheological fluid.

* * * * *